(12) United States Patent
Zhang et al.

(10) Patent No.: US 11,219,052 B2
(45) Date of Patent: Jan. 4, 2022

(54) SR-BSR AND RESOURCE MANAGEMENT

(71) Applicant: Telefonaktiebolaget LM Ericsson (publ), Stockholm (SE)

(72) Inventors: Zhan Zhang, Beijing (CN); Cecilia Eklöf, Täby (SE); Laetitia Falconetti, Järfälla (SE); Robert Karlsson, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/610,762

(22) PCT Filed: May 4, 2018

(86) PCT No.: PCT/CN2018/085679
§ 371 (c)(1),
(2) Date: Nov. 4, 2019

(87) PCT Pub. No.: WO2018/202152
PCT Pub. Date: Nov. 8, 2018

(65) Prior Publication Data
US 2020/0163109 A1    May 21, 2020

(30) Foreign Application Priority Data
May 5, 2017   (WO) ................ PCT/CN2017/083294

(51) Int. Cl.
*H04W 72/12* (2009.01)
*H04W 72/14* (2009.01)

(52) U.S. Cl.
CPC ....... *H04W 72/1284* (2013.01); *H04W 72/14* (2013.01)

(58) Field of Classification Search
CPC . H04W 72/1284; H04W 72/14; H04W 8/245; H04M 1/72519; H04M 1/72522
(Continued)

(56) References Cited

U.S. PATENT DOCUMENTS 10,555,208 B2 *   2/2020   Lee ................... H04W 28/0278
10,694,537 B2 *   6/2020   Lee ....................... H04L 1/1861
(Continued)

FOREIGN PATENT DOCUMENTS

EP        2 840 848 A1      2/2015
WO     2016/163623 A1     10/2016
(Continued)

OTHER PUBLICATIONS

Huawei et al., "SR and SSR Procedure in Short TTI", 3GPP TSG-RAN WG2 Meeting #97bis, R2-1703643, Spokane, USA, Apr. 3-7, 2017 (3 pages).
(Continued)

*Primary Examiner* — Danh C Le
(74) *Attorney, Agent, or Firm* — Rothwell, Figg, Ernst & Manbeck, P.C.

(57) ABSTRACT

According to the present disclosure, behaviors of User Equipment (UE) and base station (BS) pertinent to Scheduling Request (SR) and/or Buffer Status Report (BSR) as well as resource management in short Transmission Time Interval (sTTI) relevant scenarios are discussed. UE may firstly determine if the SR is triggered by a buffer status change of a delay-critical data which needs a sTTI. If so, UE will send the SR to BS on a first type of uplink control channel designed for sTTI. Otherwise, UE will send the SR to the base station on a second type of uplink control channel designed for legacy TTI.

17 Claims, 3 Drawing Sheets

(58) Field of Classification Search
USPC .................. 370/329, 310.2; 455/418, 450
See application file for complete search history.

(56) References Cited

U.S. PATENT DOCUMENTS

| | | | |
|---|---|---|---|
| 2010/0113057 A1* | 5/2010 | Englund | H04L 1/0028 |
| | | | 455/452.1 |
| 2015/0201388 A1* | 7/2015 | Cheng | H04W 52/281 |
| | | | 370/329 |
| 2018/0098337 A1 | 4/2018 | Lee et al. | |
| 2018/0234998 A1 | 8/2018 | You et al. | |
| 2018/0368157 A1* | 12/2018 | Jeon | H04L 5/0044 |
| 2018/0368174 A1* | 12/2018 | Jeon | H04W 72/0446 |
| 2018/0368175 A1* | 12/2018 | Jeon | H04W 72/04 |
| 2019/0223048 A1* | 7/2019 | Xu | H04W 72/10 |
| 2020/0068600 A1* | 2/2020 | Yu | H04W 28/0278 |
| 2020/0236583 A1* | 7/2020 | Tang | H04W 72/1284 |

FOREIGN PATENT DOCUMENTS

| | | |
|---|---|---|
| WO | 2017/014558 A1 | 1/2017 |
| WO | 2017/018758 A1 | 2/2017 |
| WO | 2017/053637 A1 | 3/2017 |

OTHER PUBLICATIONS

International Search Report and Written Opinion issued in International Application No. PCT/CN2018/085679 dated Jul. 30, 2018 (10 pages).

* cited by examiner

SR-BSR AND RESOURCE MANAGEMENT

CROSS REFERENCE TO RELATED APPLICATION(S)

This application is a 35 U.S.C. § 371 National Stage of International Patent Application No. PCT/CN2018/085679, filed May 4, 2018, designating the United States and claiming priority to International Patent Application No. PCT/CN2017/083294, filed on May 5, 2017. The above identified applications are incorporated by reference.

TECHNICAL FIELD

The present disclosure generally relates to the technical field of wireless communications, and particularly to behaviors of User Equipment (UE) and a Base Station (BS) pertinent to Scheduling Request (SR) and/or Buffer Status Report (BSR) as well as resource management in short Transmission Time Interval (sTTI) relevant scenarios.

BACKGROUND

In 3$^{rd}$ Generation Partnership Projection (3GPP), it is being discussed how to enhance the current mobile communication systems to provide means of communication between a wide range of machines. A subgroup of this is Critical Machine-Type Communication (CMTC) where the communication requirements of very low latency, very high reliability and very high availability must be fulfilled. Example use-cases are:
- Factory automation, where actuators, sensors and control systems communicate with each other. Typical requirement is 1 ms latency requirement.
- Motion control within construction robots, 1 ms latency requirement;
- Remote control of machines, 5-100 ms latency requirement,
- Smart energy grids, 3-5 ms latency requirement;
- Performance enhancement regarding TCP/IP Slow-start issue.

Candidate communication systems for fulfilling such requirements and use-cases are Long Term Evolution (LTE) and a newly developed radio access solution, which is called New Radio (NR) by 3GPP, for example.

In sTTI concept, a scheduling unit is defined as either a regular slot (1 ms) TTI or an sTTI slot (<1 ms). An sTTI slot can consist of one or several consecutive Orthogonal Frequency Division Multiplexing (OFDM) symbols. One possible outcome is that a slot consists of 2 or 7 OFDM symbols, but other structures, e.g., of less than 14 OFDM symbols, can be envisioned as well.

Furthermore, sTTI-enabled UEs may support different types of traffic depending on the application requirements. One such example is the co-existence of enhanced Mobile BroadBand (eMBB) communications and delay-critical traffic.

In recent 3GPP discussion, the following agreement is achieved.
- A logical channel can be configured with the type of TTI(s) it is allowed to use (e.g. either with legacy TTI, short TTI, or all). The exact signaling is FFS (For Further Study).
- Link Control Protocol (LCP) is performed only for logical channels configured to use the corresponding TTI type.
- When the UE has grants on both TTIs, it is up to UE implementation in which order the grants are processed for logical channel multiplexing (if allowed by RAN1).
- When the UE has grants on both TTIs, it is up to UE implementation to decide in which Media Access Control Packet Data Unit (MAC PDU) a MAC control element is included (if allowed by RAN1).

BSR includes buffer status for different Logical Channel (LCH) Groups (LCGs). There are different BSR formats in LTE. A long BSR MAC Control Element (CE) is 24 bits and includes buffer status for all four LCGs (6 bits buffer size each). Short BSR and Truncated BSR MAC CEs are 8 bits and include buffer status for only one LCG (6 bits buffer size, 2 bits LCG ID). The difference between the short BSR format and the truncated BSR format is to indicate if another LCG has data. If the short BSR format is used, this means that no other LCG has data than the reported LCG. If the truncated BSR is used, this means that at least one other than the reported LCG has data.

There are different types of BSR in LTE. First, the regular BSR is triggered among others to signal new data arrival for a LCH that has a higher priority than LCHs for which BSR was already reported if any. Regular BSR is included in the allocated resources before UpLink (UL) data. It has thus higher priority than data. Second, the periodic BSR is triggered by a periodic timer (every 5 ms for instance) and is also included in the allocated resources before UL data. Finally, the padding BSR is triggered in case padding bits are added to fill up the MAC PDU and the number of padding bits is equal or larger than the size of a BSR. Padding BSR is included in the allocated resources after UL data (only if there is room left). It has thus less priority than data. If padding bits can accommodate long BSR, long BSR is reported; else short BSR or truncated BSR is reported. If short BSR or truncated BSR is reported for padding BSR, short BSR is used when only one LCG has data. Otherwise truncated BSR is reported. LCH with data are ordered according to their priority and buffer status is reported for the LCG with the LCH having data of the highest priority.

Whenever a UE has traffics with different latency Quality of Services (QoSs), the UE should meet the requirements in terms of properly informing the serving evolved Node B (eNB) of a need to send data. This includes how the UE is configured and controlled to send SR and/or BSR. This facilitates the serving eNB to have the right perception of the situation of UEs with UL data to transmit.

A number of possible cases exist given occasional transmission error and multiple transmission opportunities, there is a need to provide solutions and regulations on both UE's and eNB's behaviors in the correspondence between them and selective resource scheduling.

Any ad-hoc solution based on current specification would lead to an unsatisfactory performance in latency guarantee for delay-critical services owing to possible prolonged signaling latency or eNB's misunderstanding of the request or unjustified signaling overhead.

SUMMARY

Considering the problems above, the present disclosure focuses on behaviors of UE and BS pertinent to SR and/or BSR as well as resource management in sTTI relevant scenarios.

According to one aspect of the present disclosure, there is provided a resource management method for Scheduling Request (SR) transmission. In the method, it is determined that an SR is triggered by a buffer status change of a delay-critical data which needs a short Transmission Time Interval (sTTI). Then, the SR is sent to a base station on a first type of uplink control channel designed for sTTI.

In some embodiments, it is further determined that an SR is triggered by a buffer status change of a non-delay-critical data which needs a legacy Transmission Time Interval (TTI). Then, the SR is sent to the base station on a second type of uplink control channel designed for legacy TTI.

In other embodiments, it is further determined that an SR is triggered by a buffer status change of a non-delay-critical data which needs a legacy Transmission Time Interval (TTI). Thereafter, it is determined that there is some resources on the first type of uplink control channel available for this SR. Then, the SR is sent to the base station on the first type of uplink control channel.

Alternatively, in some examples, if it is determined that an SR is triggered by a buffer status report on a delay-critical logical channel, the SR is sent to a base station on a first type of uplink control channel designed for sTTI. On the other hand, if it is determined that an SR is triggered by a buffer status report on a non-delay-critical logical channel, the SR is sent to a base station on a second type of uplink control channel designed for legacy TTI.

In further embodiments, it is further determined that no grant of a first type of uplink data channel is received within a predetermined number of transmissions on the first type of uplink control channel after sending the SR on the first type of uplink control channel. Then, the SR is sent to the base station on the second type of uplink control channel.

In some further embodiments, the method can further include steps of receiving a grant for a corresponding type of an uplink control channel; and sending, on the granted uplink control channel, a Buffer Status Report (BSR).

In some embodiments, the method can further include steps of, if only a grant for a first type of uplink control channel designed for a sTTI is received, including buffer status for a non-delay-critical logical channel group in padding BSR; and/or if only a grant for a second type of uplink control channel designed for a legacy TTI is received, including buffer status for a delay-critical logical channel group in padding BSR.

In some further embodiments, the method can further include steps of, after an SR is sent to the base station on a first type of uplink control channel, prohibiting a transmission of an SR to the base station on a second type of uplink control channel within a first predetermined time period; and/or after an SR is sent to the base station on the second type of uplink control channel, prohibiting a transmission of an SR to the base station on the first type of uplink control channel within a second predetermined time period.

In some embodiments, respective maximum numbers of SRs to be sent on respective types of uplink control channels within a certain time duration are predefined separately; and/or a maximum number of SRs to be sent totally on all types of uplink control channels within a certain time duration is predefined.

In some examples, the respective maximum numbers are identical to one another or different from one another.

In some further embodiments, the first type of uplink control channel is short Physical Uplink Control CHannel (sPUCCH), the second type of uplink control channel is Physical Uplink Control CHannel (PUCCH), and/or, the first type of uplink data channel is short Physical Uplink Shared CHannel (sPUSCH).

According to another aspect of the present disclosure, there is provided a resource management method for resource grant transmission. In the method, it is determined that a Scheduling Request (SR) is received from a user equipment on a first type of uplink control channel designed for short Transmission Time Interval (sTTI). Then, an sTTI resource grant is sent to the user equipment.

In some embodiments, it is further determined that a Scheduling Request (SR) is received from a user equipment on a second type of uplink control channel designed for legacy Transmission Time Interval (sTTI). Then, a TTI resource grant is sent to the user equipment.

In other embodiment, at the initial setting up of a data radio bearer of a low latency requirement, the first type of uplink control channel is configured for user equipments according to the shortest one of the TTI lengths of the logical channels of each of the respective user equipments.

In further embodiments, the first type of uplink control channel is short Physical Uplink Control CHannel (sPUCCH), and the second type of uplink control channel is Physical Uplink Control CHannel (sPUCCH), and/or, the first type of uplink data channel is short Physical Uplink Shared CHannel (sPUSCH), the second type of uplink data channel is Physical Uplink Shared CHannel (PUSCH).

The proposed schemes may consolidate the performance guarantee on delay-critical service and/or minimize the misconception of BS on the SR for different TTI resources. The proposed schemes may also provide regulation on the UE behavior at different cases including management of multiple pending SRs, and possible transmission failures.

BRIEF DESCRIPTION OF THE DRAWINGS

The above and other objects, features, and advantages of the present disclosure will become apparent from the following descriptions on embodiments of the present disclosure with reference to the drawings, in which.

Figure 1:
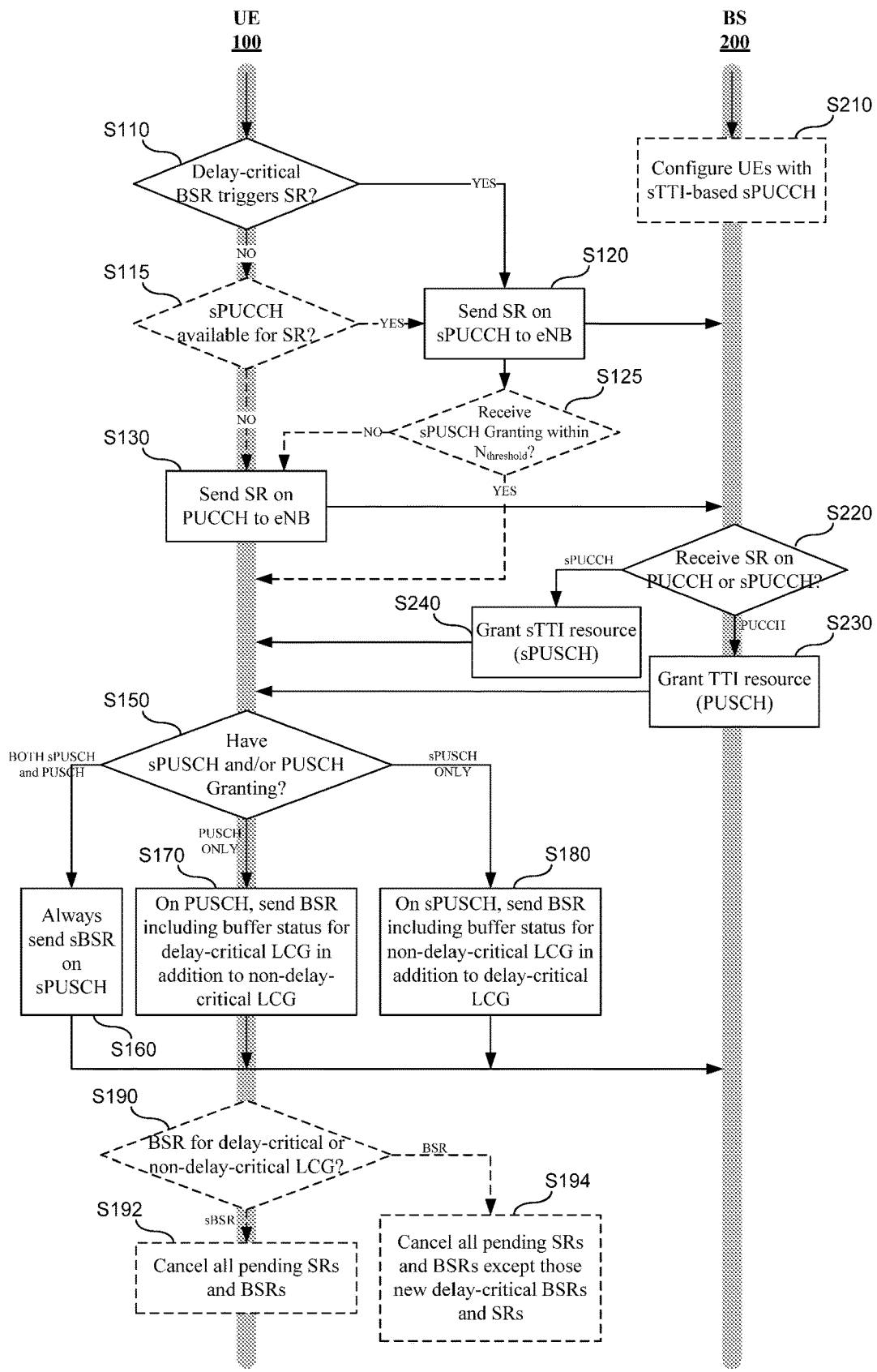
FIG. 1 shows a schematic sequential diagram of some methods according to some embodiments of the present disclosure.

In the drawings, similar or same steps and/or elements are designated with similar or same referential numbers. It is to be noted that not all the steps and/or elements shown in the drawings are necessary for some embodiments of the present disclosure.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

References in the specification to "one embodiment," "an embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "base station", "user equipment", "access point" and "network node" as used herein should be understood in a broad sense. Specifically, the base station should be understood to encompass a legacy base station in a $2^{nd}$ Generation (2G) network, a NodeB in a $3^{rd}$ Generation (3G) network, an evolved NodeB (eNode B) in a $4^{th}$ Generation (4G) or LTE network, LTE-A network etc., a gNB in a 5th Generation (5G) or NR network or future evolved network, and the like. The user equipment should be understood to encompass a mobile telephone, a smartphone, a wireless-enabled tablet or personal computer, a wireless machine-to-machine unit, and the like.

FIG. 1 shows a schematic sequential diagram of some methods according to some embodiments of the present disclosure. It should be noted although some steps are shown in FIG. 1 with a sequence in the diagram, it is not intended to limit the specific sequence of the operations, and in some cases, without resulting in confliction, some steps in FIG. 1 may be performed in a sequence different from the shown one or even can be performed in parallel. Similarly, one or more steps in FIG. 1 may be omitted according to the actual deployments, without influencing the remaining operations of the embodiment and/or other embodiments. The present disclosure is not limited thereto.

Hereunder, referring to FIG. 1, the behaviors of UE 100 and BS 200 pertinent to SR and/or BSR in sTTI relevant scenarios will be described in detail.

At the initial setting up of a Data Radio Bearer (DRB) of a low latency requirement, in step S210, BS 200 configures the UEs (for example, including UE 100) with sTTI-based sPUCCH according to the shortest one of the TTI lengths of the LCHs (LCGs) of each of the respective UEs (for example, UE 100).

To guarantee low latency performance, a proper density in time domain of sPUCCH should be configured so that the strictest latency requirement of LCHs can be met. In this situation, sPUCCH as an only physical channel for sending SR is a critical factor to determine how soon an UE can inform its serving BS of its data availability so as to initiate a UL Transmission (TX) process. If configurable sPUCCH is sparsely distributed along a time dimension so that a UE has to wait a long time before sending a SR, the overall UL latency will be undesirably extended.

Turning to UE's operations (with UE 100 as an example), a UE may utilize a type of physical channel for sending SR (e.g., Physical Uplink Control CHannel (PUCCH) or short PUCCH (sPUCCH), or any other suitable uplink control channel) to indicate a type of resources to be requested. For an instance, UE 100 with LCHs of different TTI lengths should use its physical channels for SR to implicitly indicates its request on whether sTTI data resource or regular TTI (1 ms) data resources at UE to BS 200.

In step S110, UE 100 determines if the SR is triggered by a buffer status change of a delay-critical data which needs a sTTI (for simplicity, called as "a delay-critical BSR event"). If the SR is triggered by a delay-critical BSR event (S110: Yes), then UE 100 will send its SR on sPUCCH to BS 200 (step S120). On the other hand, if the SR is triggered by a BSR triggered by a non-delay critical LCH (maybe also called as non-delay-critical LCH in the present disclosure) (S110: No), then UE 100 can send this SR on PUCCH to BS 200 (step S130). In other words, depending on the LCH that triggered a BSR, different type of SR can be triggered; a delay-critical LCH triggers a BSR (a delay-critical BSR event) and the BSR in turn triggers an SR, the SR can be transmitted with a short TTI length. A non-delay critical LCH triggers a BSR that in turn triggers an SR, the SR can be transmitted with a legacy TTI length.

Alternatively, if UE 100 determines that an SR is triggered by a BSR on a delay-critical LCH, UE 100 sends the SR to BS 200 on sPUCCH. On the other hand, if UE 100 determines that an SR is triggered by a BSR on a non-delay-critical LCH, UE 100 sends the SR to BS 200 on PUCCH.

If the data buffer of low latency requirements changes, prioritizing use of sPUCCH could expedite a SR transmission appropriately matching its real requirement on latency. In other words, SRs triggered by different LCHs or LCGs have to be ordered in its priority to maximize a control channel efficiency and effectiveness in guarantee the different QoSs of LCHs.

Optionally, a UE may prioritize to transmit an SR on sPUCCH resources if SR resources on several allowed TTI lengths are available. This could assist to speed up the slow-start-up of TCP, as some eMBB-data triggered SR can go through a sPUCCH to have a smaller TTI. For example, referring to FIG. 1, even if the SR is triggered by a BSR triggered by a non-delay critical LCH (S110: No), UE 100 may further determine in step S115 whether there are some sPUCCH resources available for this SR. If so (S115: Yes), UE 100 may go to step S120 to send its SR on sPUCCH to BS 200. Otherwise (S115: No), UE 100 goes to step S130 to send its SR on PUCCH to BS 200.

As another option, because sPUCCH may have coverage issues that are worse than PUCCH, an SR on sPUCCH might fail (not result in any UL-SCH grant being received). Therefore, UE 100 may further determine if an sPUSCH grant is received within a predetermined number $N_{threshold}$ of sPUCCH transmissions (S125). If no sPUSCH grant is received within the predetermined number $N_{threshold}$ of sPUCCH transmissions, UE 100 goes to step S130 to use PUCCH SRs instead.

Returning to BS's operation, BS 200 may use the channel types of the received SR to analyze the UE request in its scheduling. For an instance, BS 200 can identify if a received SR corresponds to delay-critical traffic by the physical channel (sPUCCH or PUCCH) where the SR is received (step S220). For example,
  a. Upon receiving an SR on PUCCH (S220: PUCCH), BS 200 can grant regular TTI (1 ms-TTI) resources (Physical Uplink Shared CHannel (PUSCH)) (S230).
  b. Upon receiving an SR on sPUCCH (short SR (sSR)) (S220: sPUCCH), BS 200 can grant short TTI (<1 ms-TTI) resources (short (sPUSCH)) (S240).

Turning to UE's operation, UE 100 may use the granted sPUSCH and/or PUSCH channel to transmit the BSRs in its buffer (pending BSRs). In step S150, UE 100 may firstly determine which kind of grants it has, i.e., whether UE has sPUSCH grant ONLY, PUSCH grant ONLY, or both. When a UE has both PUSCH and sPUSCH grants (S150: both sPUSCH and PUSCH), a short BSR for delay-critical LCG is always sent on sPUSCH (S160). Optionally per BS configuration (RRC), BSR ("padding BSR") can be sent on sPUSCH if the granted resource size is sufficient. If only an UL grant for PUSCH is available at a given time (S150: PUSCH only), BSR can include buffer status for delay-critical LCG in addition to non-delay-critical LCGs (S170) in order to indicate to the BS 200 that a switch to sTTI scheduling must be done. Similarly, if only an UL grant for sPUSCH is available at a given time (S150: sPUSCH only), BSR can include buffer status for non-delay-critical LCG in addition to delay-critical LCG (S180). That is to say, when a UE has received an UL grant for PUSCH only, a BSR can include buffer status for delay-critical LCG (S170). When a UE has received an UL grant for sPUSCH only, a BSR can include buffer status for non-delay-critical LCG (S180).

In LTE, padding BSR has lower priority over UL-SCH data to fill in the assigned resource allocation. BSR is included instead of padding bits. Thus, there may be no room for reporting buffer status for many LCGs (truncated BSR applies in LTE for this case). In that case, the LCG with the longest allowed TTI length being equal to the length of the granted UL TTI should be prioritized for inclusion in the padding BSR. The prioritization criteria can also be based on the logical channel priority configured over RRC. If there is still room in the MAC PDU, buffer status can be included next for LCGs that have an allowed TTI length equal to the length of the granted UL TTI.

In case of padding BSR, LCGs are ranked according to one or more of the following criteria: the configured allowed TTI length for this LCG, the configured longest allowed TTI length for this LCG, the configured priority for this LCG. Buffer status information is included in the padding BSR for the LCGs with a higher rank first until the granted MAC PDU is filled in. For example, if only a grant for sPUCCH is received, buffer status for a non-delay-critical LCG can be included in padding BSR; and/or if only a grant for PUCCH is received, buffer status for a delay-critical LCG can be included in padding BSR.

After configuring the sTTI parameters for both BS 200 and UE 100, one noticeable factor is that a different value on a regular SR and sSR (sTTI relevant SR) might be necessary. This is due to an sSR needs more features or adjustment for latency insurance and coverage mitigating. Different values of the counters or timers become necessary. Therefore, once sTTI feature is configured, the following proposed counters and timers are needed for a better MAC operation.

Per a BS (RRC) configuration, optionally, a new counter (sSR_COUNTER), a new timer (sSr-ProhibitTimer), and a new maximum sPUCCH SR transmission number (dsr-sTransMax) can be introduced for delay-critical LCGs.

The new counters can be defined to have a dependency towards the existing counters dsr-TransMax and sr-ProhibitTimer. There may be different ways of defining dependency:
  The sSr-ProhibitTimer shall elapse first before any SR on PUCCH can be sent, if an SR on sPUCCH has been sent first.
  The sr-ProhibitTimer shall elapse first before any SR on sPUCCH can be sent, if an SR on PUCCH has been sent first
  There might be a maximum dsr-TransMaxTotal which is the maximum number of SRs on both PUCCH and sPUCCH within a certain time duration T. The dsr-sTransMaxTotal can be defined as an own parameter which could be configurable or it can be the sum of dsr-sTransMax and dsr-TransMax, in which dsr-sTransMax is the maximum number of SRs on sPUCCH within the certain time duration T, and dsr-TransMax is the maximum number of SRs on PUCCH within the certain time duration T. Furthermore, dsr-sTransMax and dsr-TransMax can be identical to each other or can be different from each other.
  Another possibility is to split the maximum number of SRs when both sPUCCH and PUCCH are configured, either equally split or unequally split. That means that the existing dsr-TransMax defines the total maximum number of SRs within a certain time duration T, but it's valid for both sPUCCH and PUCCH when both are configured.

As yet another optional operation of UE, in step S190, UE 100 may determine whether a BSR for delay-critical LCG or for non-delay-critical LCG has been transmitted. If a short BSR for delay-critical LCG (sBSR) (S190: sBSR), UE 100 may cancel all pending SRs and BSRs (S192). If a BSR for non-delay-critical LCG (S190: BSR), UE 100 may cancel all pending SRs and BSRs except SRs and BSRs that were triggered due to new data on LCHs with low latency requirement (new delay-critical BSRs and SRs) (S194).

In other words, depending on the LCH that triggered a BSR, cancelling of BSRs and SRs can be different. A delay-critical LCH that triggers a BSR, and if the resulting BSR is transmitted on a short TTI length, UE can then cancel all pending SRs and BSRs. A non-delay critical LCH that triggers a BSR, and if the resulting BSR is transmitted on a legacy TTI length, UE can cancel all pending SRs and BSRs except SRs and BSRs that were triggered due to new data on LCHs with low latency requirement.

Any sPUSCH granting and transmission will cancel all the pending SR triggered by delay-critical data at UE.

This regulates the cancellation process for the SR triggered by different LCG(s) of different allowable TTI configurations.

In the whole operation procedure from sending an SR to receiving a UL data payload and continuously clear the buffer of UEs, BSR carries a similar role as SR but provides more concrete request info about LCH status or the most prioritized LCH status. This role is important in a sense that it can help BS to precisely grant UE-specific and time-specific, timely and suitable size of resources to meet individuals' need while trying to maximize whole system efficiency.

BSR is supposed to be sent in a MAC CE at sPUSCH for UE with delay-critical LCH to minimize the latency for UL transmission and it has a higher priority than data in a MAC PDU, otherwise, sending BSR via a PUSCH would delay the grant issuing time and eventually extends the data transmission delay.

Figure 2:
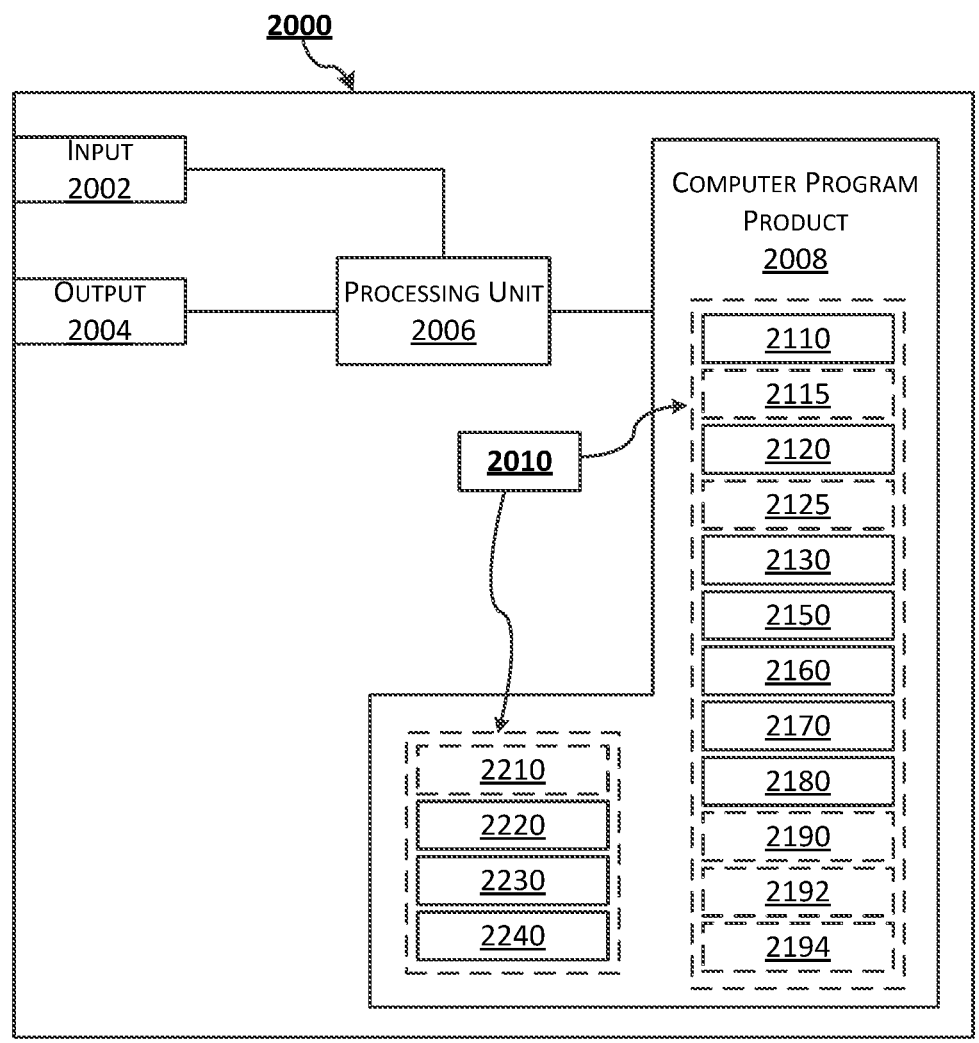
FIG. 2 schematically shows an embodiment of an apparatus 2000 which may be used as a UE 100 or a BS 200.

FIG. 2 schematically shows an embodiment of an apparatus 2000 which may be used as a UE 100 or a BS 200.

Comprised in the apparatus 2000 are here a processing unit 2006, e.g., with a Digital Signal Processor (DSP). The processing unit 2006 may be a single unit or a plurality of units to perform different actions of procedures described herein. The apparatus 2000 may also comprise an input unit 2002 for receiving signals from other entities, and an output unit 2004 for providing signal(s) to other entities. The input unit and the output unit may be arranged as an integrated entity or as illustrated in the example of FIG. 2.

Furthermore, the apparatus 2000 comprises at least one computer program product 2008 in the form of a non-volatile or volatile memory, e.g., an Electrically Erasable Programmable Read-Only Memory (EEPROM), a flash memory and a hard drive. The computer program product 2008 comprises a computer program 2010, which comprises code/computer readable instructions, which when executed by the processing unit 2006 in the apparatus 2000 causes the apparatus 2000 in which it is comprised to perform the actions, e.g., of the procedure described earlier for either UE 100 or for BS 200 in conjunction with FIG. 1.

In an embodiment, the computer program 2010 may be configured as a computer program code structured in computer program modules 2110-2194 corresponding to the actions of S110-S194 for UE 100 respectively or computer program modules 2210-2240 corresponding to the actions of S210-S240 for BS 200 respectively. A person skilled in the art may appreciate that one or more of the computer program modules 2110-2194 or 2210-2240 may be omitted according to different embodiments as listed in Supplementary Notes.

For concise and simplicity, the relevant actions of the processing unit 2006 caused by the computer program modules 2110-2194 or 2210-2240 are exactly corresponding to those performed by UE 100 or BS 200 so that apparatus 2000 can be used as the UE 100 or the BS 200 described in the present disclosure.

Although the code means in the embodiments disclosed above in conjunction with FIG. 2 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

In an embodiment of the present disclosure, there is provided a computer-readable storage medium (e.g., computer program product 2008) storing instructions that when executed, cause one or more computing devices to perform the methods according to the present disclosure.

FIGS. 3A-3F show flowcharts of some methods according to some embodiments of the present disclosure, for example, those recited in Supplemental Notes below.

Supplemental Notes:

1. A UE utilizes a type of SR channel to indicate a type of resources to be requested (e.g., FIGS. 3A & 3B).

For an instance, a UE with LCHs of different TTI lengths should use its physical channels for SR to implicitly indicates its request on whether sTTI data resource or regular TTI (1 ms) data resources at UE to BS.

2. A UE will always send its SR at sPUCCH if the SR is triggered by a buffer status change of a delay-critical data which needs a sTTI (S1010, S1020 in FIG. 3A).

If the data buffer of low latency requirements changes, the prioritizing using sPUCCH could expedite a SR transmission appropriately matching its real requirement on latency. In other words, SRs triggered by different LCHs or LCGs have to be ordered in its priority to maximize a control channel efficiency and effectiveness in guarantee the different QoS of LCHs.

3. A BS uses the channel types of the received SR to analyze the UE request in its scheduling (e.g., FIGS. 3C & 3D).

For an instance, a BS should identify if a received SR corresponds to delay-critical traffic by the physical channel (sPUCCH, or PUCCH) where the SR is received. Specifically, a. Upon receiving an SR on PUCCH, BS can grant regular TTI (1 ms-TTI) resources (PUSCH) (S2022, S2030 in FIG. 3C).

b. Upon receiving an SR on sPUCCH (sSR), BS can grant short TTI (<1 ms-TTI) resources (sPUSCH) (S2020, S2040 in FIG. 3D)

4. At the initial setting up of a DRB of a low latency requirement, BS configures the UE with sTTI-based sPUCCH according to the lowest of TTI lengths of the LCHs (LCGs) of the UE.

To guarantee low latency performance, a proper density in time domain of sPUCCH should be configured so that the strictest latency requirement of LCHs is met. At this situation, sPUCCH as an only physical channel for sending SR is a critical factor to determine how soon an UE could inform its serving BS of its data availability so as to initiate a UL tx process. If configurable sPUCCH is sparsely distributed along a time dimension so that a UE has to wait a long time before sending a SR, the overall UL latency is undesirably extended.

5. A UE always prioritizes to transmit an SR on sPUCCH resources, if SR resources on several allowed TTI lengths are available.

This could assist to speed up the slow-start-up of TCP, as some eMBB-data triggered SR could go through a sPUCCH to have a smaller TTI.

6. Any sPUSCH granting and transmission will cancel all the pending SR triggered by delay-critical data at UE.

This regulates the cancellation process for the SR triggered by different LCG(s) of different allowable TTI configurations.

In the whole operation procedure from sending a SR to receiving a UL data payload and continuously clear the buffer of UEs, BSR carries a similar role as SR but provides more concrete request info about LCH status or the most prioritized LCH status. This role is important in a sense that it can help BS to precisely grant UE- and time-specific timely and suitable size of resources to meet individuals' need while trying to maximize whole system efficiency.

BSR is supposed to be sent a MAC CE at sPUSCH for UE with delay-critical LCH to minimize the latency for UL transmission and it has a higher priority than data in a MAC PDU, otherwise, sending it via a PUSCH would delay the grant issuing time and eventually extends the data transmission delay. Then we have the following management:

7. When a UE has a both PUSCH and sPUSCH granting, a short BSR for delay-critical LCG is always sent at sPUSCH. Optionally per BS configuration (RRC), BSR ("padding BSR) can be sent at sPUSCH if the granted resource size is sufficient.

If only an UL grant for PUSCH is available at a given time, BSR can include buffer status for delay-critical LCG in addition to other LCGs in order to indicate to the BS that a switch to sTTI scheduling must be done. Similarly if only an UL grant for sPUSCH is available at a given time, BSR can include buffer status for non-delay-critical LCG in addition to delay-critical LCG.

8. When a UE has received an UL grant for PUSCH only, a BSR can include buffer status for delay-critical LCG. When a UE has received an UL grant for sPUSCH only, a BSR can include buffer status for non-delay-critical LCG.

In LTE, padding BSR has lower priority over UL-SCH data to fill in the assigned resource allocation. BSR is included instead of padding bits. Thus, there may not be room for reporting buffer status for many LCGs (truncated BSR applies in LTE for this case). In that case, the LCG with the longest allowed TTI length being equal to the length of the granted UL TTI should be prioritized for inclusion in the padding BSR. The prioritization criteria can also be based on the logical channel priority configured over RRC. If there is still room in the MAC PDU, buffer status can be included next for LCGs that have as allowed TTI length the length of the granted UL TTI.

9. In case of padding BSR, LCGs are ranked according to one or more of the following criteria: the configured allowed TTI length for this LCG, the configured longest allowed TTI length for this LCG, the configured priority for this LCG. Buffer status information is included in the padding BSR for the LCGs with a higher rank first until the granted MAC PDU is filled in.

After configuring the sTTI parameters for both BS and UE, one noticeable factor is that a different value on a regular SR and sSR (sTTI relevant SR) might be necessary. This is due to a sSR needs more features or adjustment for latency insurance and coverage mitigating. Different values of the counters or timers become necessary. Therefore, once sTTI feature is configured, the following proposed counters and timers are needed for a better MAC operation.

10. Per a BS (RRC) configuration, optionally, a new counter (sSR_COUNTER), a new timer (sSr-ProhibitTimer), and a new maximum sPUCCH SR transmission number (dsr-sTransMax) can be introduced for delay-critical LCGs.

The new counters can be defined to have a dependency towards the existing counters dsr-TransMax and sr-ProhibitTimer. There may be different ways of defining dependency:

The sSr-ProhibitTimer shall elapse first before any SR on PUCCH can be sent, if an SR on sPUCCH has been sent first.

The sr-ProhibitTimer shall elapse first before any SR on sPUCCH can be sent, if an SR on PUCCH has been sent first There might be a maximum dsr-TransMaxTotal which is the maximum number of SRs on both PUCCH and sPUCCH within a certain time duration T. The dsr-sTransMaxTotal can be defined as an own parameter which could be configurable or it can be the sum of dsr-sTransMax and dsr-TransMax, in which dsr-sTransMax is the maximum number of SRs on sPUCCH within the certain time duration T, and dsr-TransMax is the maximum number of SRs on PUCCH within the certain time duration T. Furthermore, dsr-sTransMax and dsr-TransMax can be identical to each other or can be different from each other.

Another possibility is to split the maximum number of SRs when both sPUCCH and PUCCH are configured, either equally split or unequally split. That means that the existing dsr-TransMax defines the total maximum number of SRs within a certain time duration T, but it's valid for both sPUCCH and PUCCH when both are configured.

11. Depending on the LCH that triggered a BSR, different type of scheduling requests can be triggered.

Figure 3A:
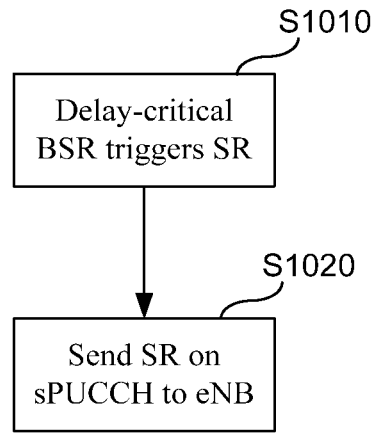
FIGS. 3A-3F show flowcharts of some methods according to some embodiments of the present disclosure.

A delay-critical LCH that triggers a BSR that triggers an SR, the SR can be transmitted on short TTI length (S1010, S1020 in FIG. 3A).

Figure 3B:
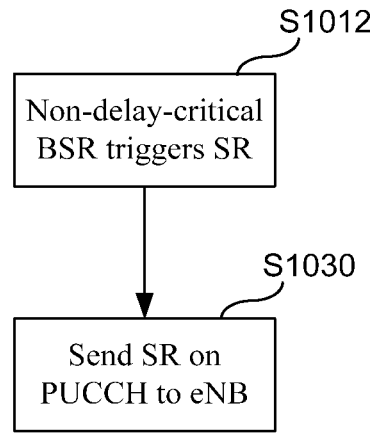
Figure 3C:
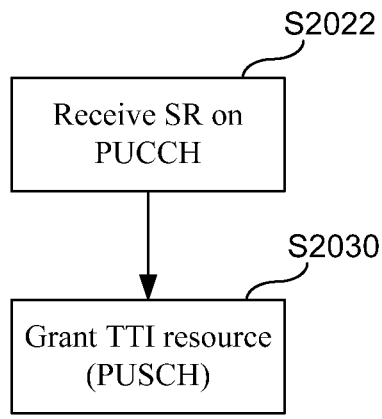
Figure 3D:
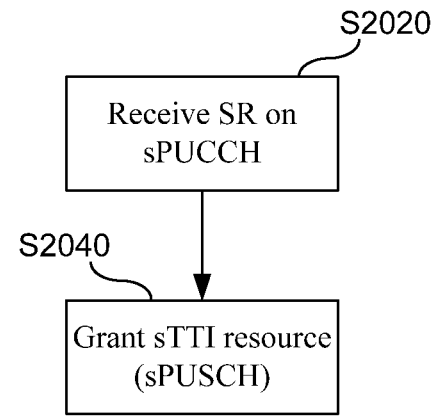

A not delay critical LCH that triggers a BSR that triggers an SR, the SR can be transmitted on a legacy TTI length (S1012, S1030 in FIG. 3B).

12. Depending on the LCH that triggered a BSR, cancelling of BSRs and SRs can be different.

Figure 3E:
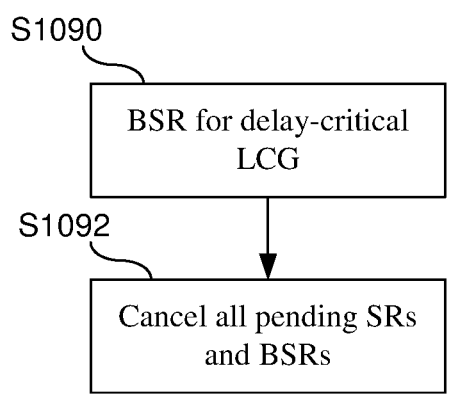

A delay-critical LCH that triggers a BSR; if the resulting BSR is transmitted on a short TTTI length it can then cancel all pending SRs and BSRs (S1090, S1092 in FIG. 3E).

Figure 3F:
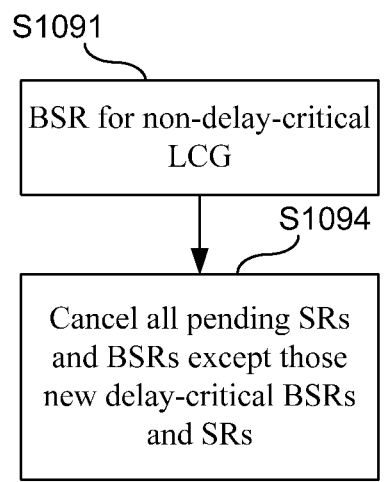

A not delay critical LCH that triggers a BSR if the resulting BSR is transmitted on a legacy TTI length it can cancel all pending SRs and BSRs except SRs and BSRs that were triggered due to new data on LCHs with low latency requirement (S1091, S1094 in FIG. 3F).

13. Fallback solution for SR on sPUCCH to PUCCH.

As sPUCCH might have coverage issues that are worse than PUCCH, an SR on sPUCCH might fail (not result in any UL-SCH grant being received). If no UL-SCH grant has been received within a number of sPUCCH transmissions, we can go over and use PUCCH SRs instead.

Although the present technology has been described above with reference to specific embodiments, it is not intended to be limited to the specific form set forth herein. For example, the embodiments presented herein are not limited to the existing NR/LTE configuration; rather they are equally applicable to new NR/LTE configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method in a user equipment (UE), comprising:
   selecting a first type of uplink control channel on which to transmit a Scheduling Request (SR) being triggered by a buffer status change;
   sending the SR to a base station on a first uplink control channel, wherein the first uplink control channel is of the selected first type of uplink control channel;
   determining that no grant of a first type of uplink data channel is received within a predetermined number of transmissions on the first type of uplink control channel after sending the SR on the first type of uplink control channel; and
   sending the SR to the base station on a second uplink control channel that is of second type of uplink control channel that is different than the first type of uplink control channel.

2. The method of claim 1, wherein
   the first type of uplink control channel is a type of uplink control channel designed for a short Transmission Time Interval (sTTI), and
   the UE selects the first type of uplink control channel as a result of determining that the SR is triggered by a buffer status change of a delay-critical.

3. The method of claim 1, wherein
   the first type of uplink control channel is a type of uplink control channel designed for a legacy Transmission Time Interval (TTI), and
   the UE selects the first type of uplink control channel as a result of determining that the SR is triggered by a buffer status change of a non-delay-critical data.

4. The method of claim 1, wherein
   the first type of uplink control channel is selected as a result of determining that the SR is triggered by a buffer status report on a delay-critical logical channel, and
   the first type of uplink control channel is designed for short Transmission Time Interval (sTTI).

5. The method of claim 1, wherein
   the first type of uplink control channel is selected as a result of determining that the SR is triggered by a buffer status report on a non-delay-critical logical channel, and
   the first type of uplink control channel is designed for legacy Transmission Time Interval (TTI).

6. The method of claim 1, further comprising:
   the first type of uplink control channel is selected as a result of determining that there are some resources on the first type of uplink control channel available for the SR, and
   the first type of uplink control channel is designed for short Transmission Time Interval (sTTI).

7. The method of claim 1, further comprising:
   receiving a grant for a first type of an uplink data channel; and
   sending, on the granted uplink data channel, a Buffer Status Report (BSR).

8. The method of claim 7, further comprising:
   if the first type of uplink data channel is designed for a short Transmission Time Interval (sTTI), including buffer status for a non-delay-critical logical channel group in padding BSR; and/or
   if the first type of uplink data channel is designed for a legacy Transmission Time Interval (TTI), including buffer status for a delay-critical logical channel group in padding BSR.

9. The method of claim 1, further comprising:
   after an SR is sent to the base station on a first type of uplink control channel, prohibiting a transmission of an SR to the base station on a second type of uplink control channel within a first predetermined time period; and/or
   after an SR is sent to the base station on the second type of uplink control channel, prohibiting a transmission of an SR to the base station on the first type of uplink control channel within a second predetermined time period.

10. The method of claim 1, wherein
    respective maximum numbers of SRs to be sent on respective types of uplink control channels within a certain time duration are predefined separately; and/or
    a maximum number of SRs to be sent totally on all types of uplink control channels within a certain time duration is predefined.

11. The method of claim 10, wherein
    the respective maximum numbers are identical to one another.

12. The method of claim 1, wherein
    the first type of uplink control channel is short Physical Uplink Control CHannel (sPUCCH), the second type of uplink control channel is Physical Uplink Control CHannel (PUCCH), and/or, the first type of uplink data channel is short Physical Uplink Shared CHannel (sPUSCH).

13. A user equipment comprising:
    a processor; and
    a memory having stored thereon a computer program which, when executed on the processor, causes the processor to carry out the method of claim 1.

14. A method in a base station, comprising:
    receiving, on a first uplink control channel, a first Scheduling Request (SR) transmitted by a user equipment, wherein the first uplink control channel is of a first type of uplink control channel;
    determining a type of the received SR based on the first type of the uplink control channel on which the SR is received;
    sending to the user equipment, a grant for a first type of uplink data channel, wherein the first type of uplink data channel corresponds to the first type of uplink control channel; and
    if it is determined that a second SR is received from the user equipment on a second type of uplink control channel designed for legacy Transmission Time Interval (TTI), sending to the user equipment a second grant for a second type of uplink data channel, wherein the second type of uplink data channel corresponds to the second type of uplink control channel.

15. The method of claim 14, wherein
    if it is determined that a Scheduling Request (SR) is received from a user equipment on a first type of uplink control channel designed for short Transmission Time Interval (sTTI), sending a grant of a first type of uplink data channel to the user equipment.

16. The method of claim 14, further comprising:
at the initial setting up of a data radio bearer of a low latency requirement, configuring the first type of uplink control channel for user equipments according to the shortest one of the TTI lengths of the logical channels of each of the respective user equipments.

17. The method of claim 14, wherein
the first type of uplink control channel is short Physical Uplink Control CHannel (sPUCCH), the second type of uplink control channel is Physical Uplink Control CHannel (PUCCH), and/or, the first type of uplink data channel is short Physical Uplink Shared CHannel (sPUSCH), the second type of uplink data channel is Physical Uplink Shared CHannel (PUSCH).

* * * * *